(12) United States Patent
Berry et al.

(10) Patent No.: US 8,829,719 B2
(45) Date of Patent: Sep. 9, 2014

(54) SYSTEM FOR MULTIPLE ENERGY STORAGE AND MANAGEMENT AND METHOD OF MAKING SAME

(75) Inventors: Irene Michelle Berry, Schenectady, NY (US); Robert Dean King, Schenectady, NY (US); Paul Robert Gemin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 13/283,931

(22) Filed: Oct. 28, 2011

(65) Prior Publication Data

US 2012/0038215 A1    Feb. 16, 2012

Related U.S. Application Data

(63) Continuation-in-part of application No. 13/224,669, filed on Sep. 2, 2011, which is a continuation of application No. 12/539,056, filed on Aug. 11, 2009, now Pat. No. 8,026,638.

(51) Int. Cl.

| | |
|---|---|
| H02J 1/00 | (2006.01) |
| H02J 5/00 | (2006.01) |
| B60L 11/12 | (2006.01) |
| B60L 11/18 | (2006.01) |
| H02M 3/155 | (2006.01) |
| H02J 7/34 | (2006.01) |
| H02J 7/00 | (2006.01) |

(52) U.S. Cl.
CPC ............ *B60L 11/1816* (2013.01); *Y02T 90/121* (2013.01); *Y02T 10/7066* (2013.01); *Y02T 10/7225* (2013.01); *H02M 3/155* (2013.01); *Y02T 10/7055* (2013.01); *Y02T 10/7005* (2013.01); *B60L 11/126* (2013.01); *H02J 7/345* (2013.01); *B06L 11/005* (2013.01); *Y02T 90/127* (2013.01); *B60L 2210/40* (2013.01); *Y02T 10/7241* (2013.01); *H02J 7/0013* (2013.01); *Y02T 10/7088* (2013.01); *B60L 11/1803* (2013.01); *Y02T 90/14* (2013.01); *Y02T 10/7077* (2013.01); *Y02T 10/7022* (2013.01); *Y02T 10/6217* (2013.01); *B60L 11/1853* (2013.01); *B60L 2210/14* (2013.01); *B60L 11/1868* (2013.01)

USPC ................................. 307/77; 307/45; 307/46

(58) Field of Classification Search
USPC ............................................... 307/45, 46, 77
See application file for complete search history.

(56) References Cited

U.S. PATENT DOCUMENTS

| | | |
|---|---|---|
| 5,373,195 A | 12/1994 | De Doncker et al. |
| 5,710,699 A | 1/1998 | King et al. |
| 5,903,449 A | 5/1999 | Garrigan et al. |
| 6,331,365 B1 | 12/2001 | King |
| 6,737,822 B2 | 5/2004 | King |

(Continued)

*Primary Examiner* — Hal Kaplan
(74) *Attorney, Agent, or Firm* — Ziolkowski Patent Solutions Group, SC; Jean K. Testa

(57) ABSTRACT

A propulsion system includes an electric drive, a first energy storage system electrically coupled to the electric drive through a DC link, and a second energy storage system electrically coupled to the first energy storage system in a series connection. The first energy storage system comprises a high specific-energy storage device; the second energy storage system comprises a high specific-power storage device. The propulsion system also includes a bi-directional boost converter electrically coupled to the first and second energy storage systems such that a terminal of the first energy storage system is electrically coupled to a low voltage side of the bi-directional boost converter and a first terminal of the second energy storage system is coupled to a high voltage side of the bi-directional boost converter. The series connection bypasses the bi-directional boost converter.

20 Claims, 4 Drawing Sheets

(56) References Cited

U.S. PATENT DOCUMENTS

| | | |
|---|---|---|
| 7,049,792 B2 | 5/2006 | King |
| 2004/0100149 A1 | 5/2004 | Lai |
| 2006/0125319 A1 | 6/2006 | King et al. |
| 2007/0158118 A1 | 7/2007 | King |
| 2007/0164693 A1 | 7/2007 | King et al. |
| 2008/0113268 A1 | 5/2008 | Buiel et al. |

SYSTEM FOR MULTIPLE ENERGY STORAGE AND MANAGEMENT AND METHOD OF MAKING SAME

CROSS-REFERENCE TO RELATED APPLICATION

The present application is a continuation-in-part of and claims priority to U.S. patent application Ser. No. 13/224,669 filed Sep. 2, 2011, which claims priority to U.S. patent application Ser. No. 12/539,056 filed Aug. 11, 2009, now U.S. Pat. No. 8,026,638 issued on Sep. 27, 2011, the disclosures of which are incorporated herein.

BACKGROUND

Embodiments of the invention relate generally to drive systems, and more specifically to battery powered drive systems such as those used in battery-powered electric vehicles or hybrid vehicles.

Recently, electric vehicles and hybrid electric vehicles have become increasingly popular. These vehicles are typically powered by one or more batteries, either alone or in combination with an internal combustion engine. In electric vehicles, the one or more batteries power the entire drive system, thereby eliminating the need for an internal combustion engine. Hybrid electric vehicles, on the other hand, include an internal combustion engine to supplement the battery power, which greatly increases the fuel efficiency of the vehicle.

Traditionally, the electric and hybrid electric propulsion systems in these vehicles use large batteries, ultracapacitors, flywheels, or a combination of these elements so as to provide sufficient energy to power the electric motor. While generally effective, the size and weight of the elements reduced the overall efficiency of the propulsion system and presented challenges for integration into the vehicles themselves.

Another challenge related to conventional electric propulsion systems is that the nominal voltage of the energy storage units (i.e., batteries and/or ultracapacitors) set the overall system voltage. Thus, the energy available to power the electric motor was limited to the energy available in the energy storage units themselves. Such a configuration limits the overall reliability and efficiency of the electric propulsion system, as the voltage demands of the electric motor were often far greater than the energy storage unit voltage. To combat this issue, a bi-directional boost converter may be used to decouple the energy storage unit voltage from a direct current (DC) link voltage, wherein the DC link is coupled to the electric motor. The bi-directional boost converter acts to increase, or "boost", the voltage provided from the energy storage unit to the DC link to meet the power demands of the electric motor. In fact, the ratio of the DC link voltage to the energy storage unit voltage is typically greater than 2:1. The bi-directional boost converter enables such an increase in voltage supplied to the DC link without the need for an increase in the size of the energy storage unit or units.

While the bi-directional boost converter successfully allows for an increased supply of voltage to the DC link without a corresponding increase in size of the energy storage unit(s), the efficiency of the bi-directional boost converter degrades during certain operating modes. In particular, during high-speed and high-power acceleration and deceleration of the vehicle, the ratio of DC link voltage to battery voltage is often greater than 2.5:1. Under these operating modes, the level of electrical current to which the components of the boost converter are subjected is very high, and therefore there is a subsequent need for proper thermal design to dissipate heat in the power electronic components of the boost converter. This thermal cycling stress on the components of the bi-directional boost converter may reduce reliability as well as overall system efficiency.

Furthermore, during high-speed and high-power deceleration, a concept known as "regenerative braking" enables power at potentially relatively high voltage generated by the electric motor to be cycled back through the bi-directional boost converter for storage in the energy storage unit(s). However, at high DC link voltage to battery voltage ratios, high losses within the bi-directional boost converter call for proper heat dissipation in the electrical components. Also, the regeneration power provided to the energy storage unit is often limited by the charge acceptance of the energy storage unit itself, which further reduces the efficiency of the system.

Therefore, it is desirable to provide an electric and/or hybrid electric propulsion system having greater overall system efficiency and a lower cost than traditional electric and hybrid electric propulsion systems.

BRIEF DESCRIPTION OF THE INVENTION

Embodiments of the invention provide a propulsion system that includes an electric drive and a first energy storage system electrically coupled to the electric drive through a direct current (DC) link, the first energy storage system comprising a high specific-energy storage device. The propulsion system also includes a second energy storage system electrically coupled to the first energy storage system in a series connection, the second energy storage system comprising a high specific-power storage device. The propulsion system further includes a first bi-directional boost converter electrically coupled to the first and second energy storage systems such that a terminal of the first energy storage system is electrically coupled to a low voltage side of the first bi-directional boost converter and a first terminal of the second energy storage system is coupled to a high voltage side of the first bi-directional boost converter. The series connection bypasses the first bi-directional boost converter.

In accordance with another aspect of the invention, a method of assembling a control system for an electric drive includes providing a first bi-directional boost converter and coupling a first terminal of a high specific-energy storage device to a low-voltage side of the first bi-directional boost converter. The method also includes coupling a first terminal of a high specific-power storage device to a high-voltage side of the first bi-directional boost converter, and coupling the high specific-energy storage device in series with the high specific-power storage device such that the first terminal of the high specific-energy storage device is electrically coupled to a second terminal of the high specific-power storage device.

In accordance with another aspect of the invention, an energy storage arrangement for an electrically powered system includes a first bi-directional boost converter and a first energy storage system electrically coupled to a first side of the first bi-directional boost converter, the first energy storage system comprising a high specific-energy storage device. The energy storage arrangement also includes a second energy storage system electrically coupled to a second side of the first bi-directional boost converter, the second energy storage system comprising a high specific-power storage device. Further, the energy storage arrangement includes an electrical link forming a series connection between a positive terminal of the first energy storage system and a negative terminal of the second energy storage system, wherein the electrical link bypasses the first bi-directional boost converter.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

A system is shown to include an electric drive, a first energy storage system comprising at least a high specific-power energy storage device, such as an ultracapacitor, and a second energy storage system electrically coupled to the electric drive through a direct current (DC) link. Both the first energy storage system and the second energy storage system are electrically coupled to a multi-channel bi-directional boost converter. Furthermore, the positive terminal of the high specific-power energy storage device is also coupled to the negative terminal of the second energy storage system to bypass the multi-channel bi-directional boost converter. Such a connection between the high specific-power energy storage device and the second energy storage device enables a high voltage level to be provided to the electric drive during acceleration, as well as an increased capability for energy capture in the first energy storage system during regenerative braking events.

Figure 1:
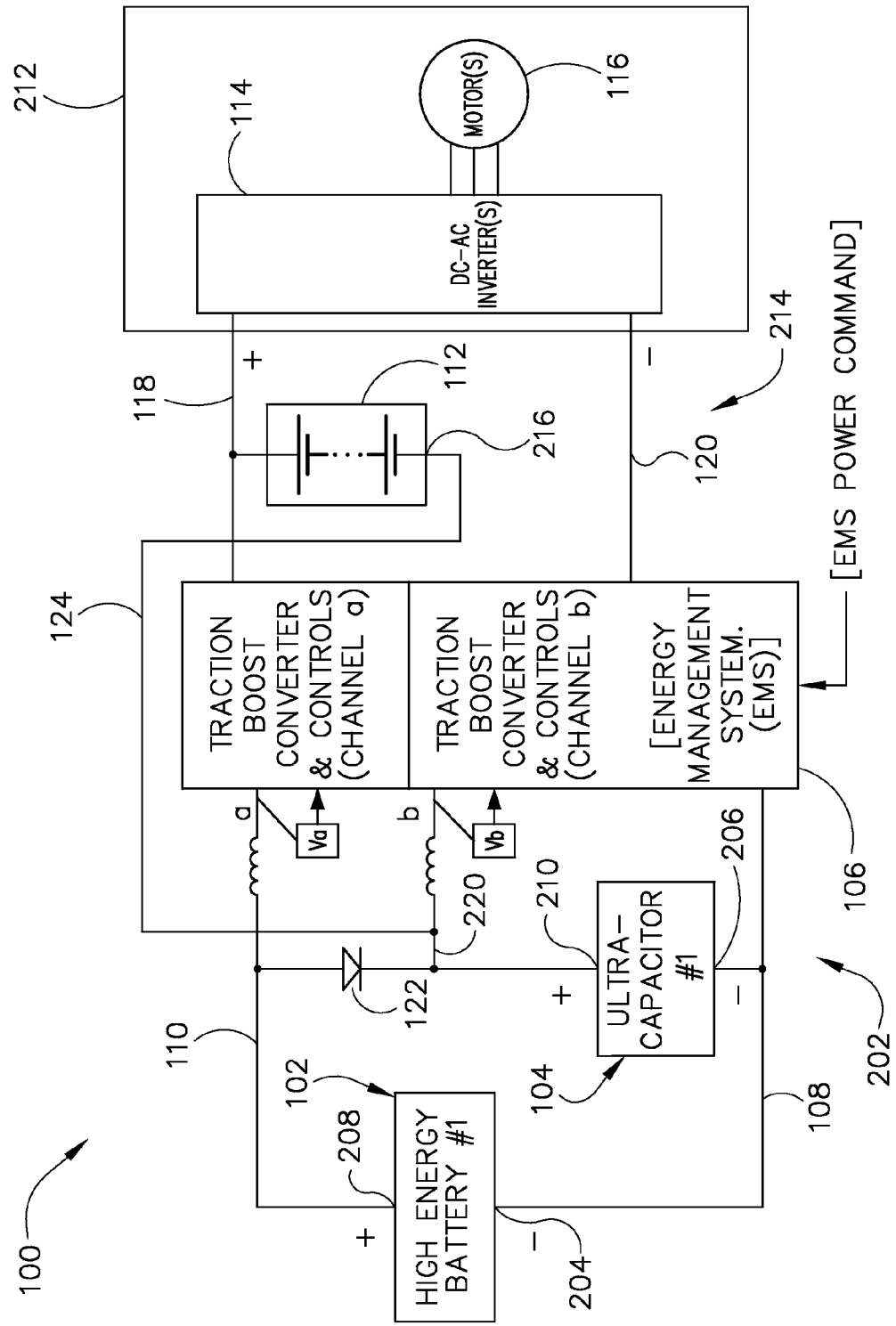
FIG. 1 schematically illustrates a propulsion system according to an embodiment of the invention.

Referring to FIG. 1, a propulsion system 100 according to an embodiment of the invention is shown. Propulsion system 100 includes, in part, a first energy storage system comprising an energy battery 102 and a high specific-power energy storage device 104. Propulsion system 100 also includes a multi-channel bi-directional boost converter 106. High specific-power energy storage device 104 may be, for example, an ultracapacitor. In this case, an ultracapacitor represents a capacitor comprising multiple capacitor cells coupled to one another, where the capacitor cells may each have a capacitance that is greater than 500 Farads. The term energy battery used herein describes a high specific energy battery or high energy density battery demonstrated to achieve an energy density on the order of 100 W-hr/kg or greater (e.g., a Li-ion, sodium-metal halide, sodium nickel chloride, sodium-sulfur, zinc-air, nickel metal halide, or lead acid battery, or the like). Energy battery 102 and high specific-power energy storage device 104 are coupled together on a low-voltage side 202 of multi-channel bi-directional boost converter 106, wherein a negative terminal 204 of energy battery 102 and a negative terminal 206 of high specific-power energy storage device 104 are coupled to a bus 108, while a positive terminal 208 of energy battery 102 is coupled to a bus 110, which is a positive bus that connects through an inductor to one channel of multi-channel bi-directional boost converter 106 on the low-voltage side 202 of multi-channel bi-directional boost converter 106. A positive terminal 210 of high specific-power energy storage device 104 is coupled to a bus 220, which is coupled through an inductor on the low-voltage side 202 at a second channel (b) of multi-channel bi-directional boost converter 106.

System 100 further includes a second energy storage system, which comprises an energy storage device 112, and an AC traction drive 212, which includes a DC-AC inverter 114 and an AC motor 116 coupled to a high-voltage side 214 of multi-channel bi-directional boost converter 106. Energy storage device 112 may be, for example, a battery having a high specific-power rating. Alternatively, energy storage device 112 may also be an ultracapacitor. AC traction drive 212, in an alternative embodiment, may be replaced by a DC traction drive (not shown) by replacing inverter 114 with a DC chopper (not shown) and by replacing AC motor 116 with a DC motor (not shown). Energy storage device 112 is coupled with multi-channel bi-directional boost converter 106 via a positive DC link 118. DC-AC inverter 114 is also coupled to positive DC link 118 and a negative DC link 120, through which DC-AC inverter 114 receives a DC voltage and then supplies an alternating current to AC motor 116. Negative DC link 120 typically has the same potential as bus 108 on low-voltage side 202 of multi-channel bi-directional boost converter 106.

During typical operation, multi-channel bi-directional boost converter 106 acts to boost the voltage provided by low-voltage side 202 of system 100 to high-voltage side 214 of system 100, as well as to regulate the voltage and provide over-current protection to energy battery 102, high specific-power energy storage device 104, and energy storage device 112. While energy storage device 112 (or the combination of energy storage device 112 and high specific-power energy storage device 104) is generally capable of providing sufficient voltage to power the AC motor 116 such that a vehicle may be operated at a relatively slow speed, the voltage provided to the AC motor 116 during periods of increased acceleration may need to be supplemented. In such instances, energy from energy battery 102 on low-voltage side 202 of multi-channel bi-directional boost converter 106 is utilized to provide the voltage necessary for increased acceleration of the vehicle. Energy from energy battery 102 is used when the State of Charge (SOC) of high specific-power energy storage device 104 is depleted below some predetermined minimum value, typically a value below the voltage of battery 102. When the SOC of high specific-power energy storage device 104 reaches this predetermined minimum value, a unidirectional coupling device 122 conducts such that the multi-channel bi-directional boost converter 106 extracts energy primarily from energy battery 102 using two channels of the multi-channel bi-directional boost converter 106, thereby allowing approximately twice the rated power compared to a single channel of the multi-channel bi-directional boost converter 106. Unidirectional coupling device 122 is shown to be a diode in the embodiment of FIG. 1, but it is to be understood that unidirectional conducting apparatus 122 could be implemented using other known components and circuit techniques. Such a configuration acts to facilitate increasing the operation speed of the vehicle, particularly when the available energy of high specific-power energy storage device 104 is depleted or near a predetermined voltage limit.

In the event high specific-power energy storage device 104 is at a relatively low SOC, or low voltage, energy battery 102 voltage can be boosted to the high side DC links 118 and 120 via low side (channel "a") of multi-channel bi-directional boost converter 106 through positive bus 110. The voltage provided by energy battery 102 through positive bus 110 and/or high specific-power energy storage device 104 through a positive bus 220 is "boosted," or increased, via the multi-channel bi-directional boost converter 106 by a boost ratio typically greater than 2:1. In this way, even with the output capabilities of energy battery 102 and/or high specific-power energy storage device 104, the voltage and power needed to accelerate AC motor 116 may be provided due to the voltage-boosting capabilities of multi-channel bi-directional boost converter 106. In addition, energy from the energy battery 102 may be utilized to charge one or both of high specific-power energy storage device 104 and energy storage device 112 simultaneously via multi-channel bi-directional boost converter 106.

While the operation of multi-channel bi-directional boost converter 106 may be sufficient under normal operating conditions (e.g., low acceleration and/or deceleration), the efficiency of multi-channel bi-directional boost converters such as multi-channel bi-directional boost converter 106 may degrade during high acceleration or deceleration of the vehicle. That is, as there is an increase in the ratio of voltage required to sufficiently power an AC motor versus voltage available on the respective low voltage sides of the multi-channel bi-directional boost converter, a multi-channel bi-directional boost converter may experience increased electrical loss, leading to thermal cycling stresses due to an increase in electrical current through components of the multi-channel bi-directional boost converter. These increased currents may lower the efficiency of the bi-directional boost converter, which require proper thermal design and hardware to dissipate the heat from these losses in the power electronic components. However, the embodiment shown in FIG. 1 addresses this issue to greatly improve the efficiency of system 100, especially during operation at relatively high power, high speed vehicle acceleration and deceleration.

Specifically, the positive terminal 210 of high specific-power energy storage device 104 is coupled in series with the negative terminal 216 of energy storage system 112 via a link 124. Link 124 bypasses one channel of multi-channel bi-directional boost converter 106 to enable the voltage outputs of high specific-power energy storage device 104 and energy storage device 112 to be summed, thereby utilizing the high specific-power characteristics of high specific-power energy storage device 104 and energy storage device 112. During motoring events such as pulsed loads, steady state loads, vehicle cruise, and vehicle acceleration, the combined voltage of these two energy storage devices can be used to provide sufficient voltage and power to AC motor 116 without incurring losses related to passing current through multi-channel bi-directional boost converter 106. Additionally, coupling high specific-power energy storage device 104 and second energy storage device 112 in series enables fewer battery cells to be used as compared to conventional traction battery systems having one or more traction batteries directly coupled to a DC link of an inverter or load, thereby reducing cost, weight, balancing, and reliability issues.

In addition to providing increased power capabilities for acceleration of the motor, the series connection of high specific-power energy storage device 104 and energy storage device 112 also provides for greater efficiency for energy capture during regenerative braking events. Unlike energy battery 102, both high specific-power energy storage device 104 and energy storage device 112 are operable at a low SOC and are capable of rapid high power electrical charge acceptance. As such, these energy storage devices are capable of accepting much of the regenerative power from the high voltage regenerated energy generated by AC motor 116 during overhauling loads such as vehicle deceleration. During such regenerative braking events, regenerative energy can be efficiently stored in high specific-power energy storage device 104 and energy storage device 112, again without incurring the losses associated with the limitations of multi-channel bi-directional boost converter 106, as link 124 enables the bypass of multi-channel bi-directional boost converter 106. The energy stored in high specific-power energy storage device 104 and energy storage device 112 can then be used for subsequent accelerations, which again improves the overall efficiency of the entire propulsion system 100.

Yet another advantage to the exemplary embodiment of FIG. 1 is the ability to dynamically control the energy levels provided to and from the energy storage devices. Multi-channel bi-directional boost converter 106 is operable as an Energy Management System (EMS) to adaptively control these energy levels based on parameters such as vehicle speed, AC traction drive torque demand, AC traction drive speed, and various electrical characteristics of the energy storage units, such as SOC, voltage levels, state of health, and temperature. For example, such dynamic control enables multi-channel bi-directional boost converter 106 to independently control the amount of energy supplied by high specific-power energy storage device 104 and/or energy battery 102 during typical vehicle acceleration. Likewise, during deceleration, multi-channel bi-directional boost converter 106 operates to control the amount of regenerated energy provided to energy storage device 112, high specific-power energy storage device 104, and/or energy battery 102 to maximize the overall charge acceptance of the system. Such dynamic control greatly improves the overall efficiency of system 100.

Figure 2:
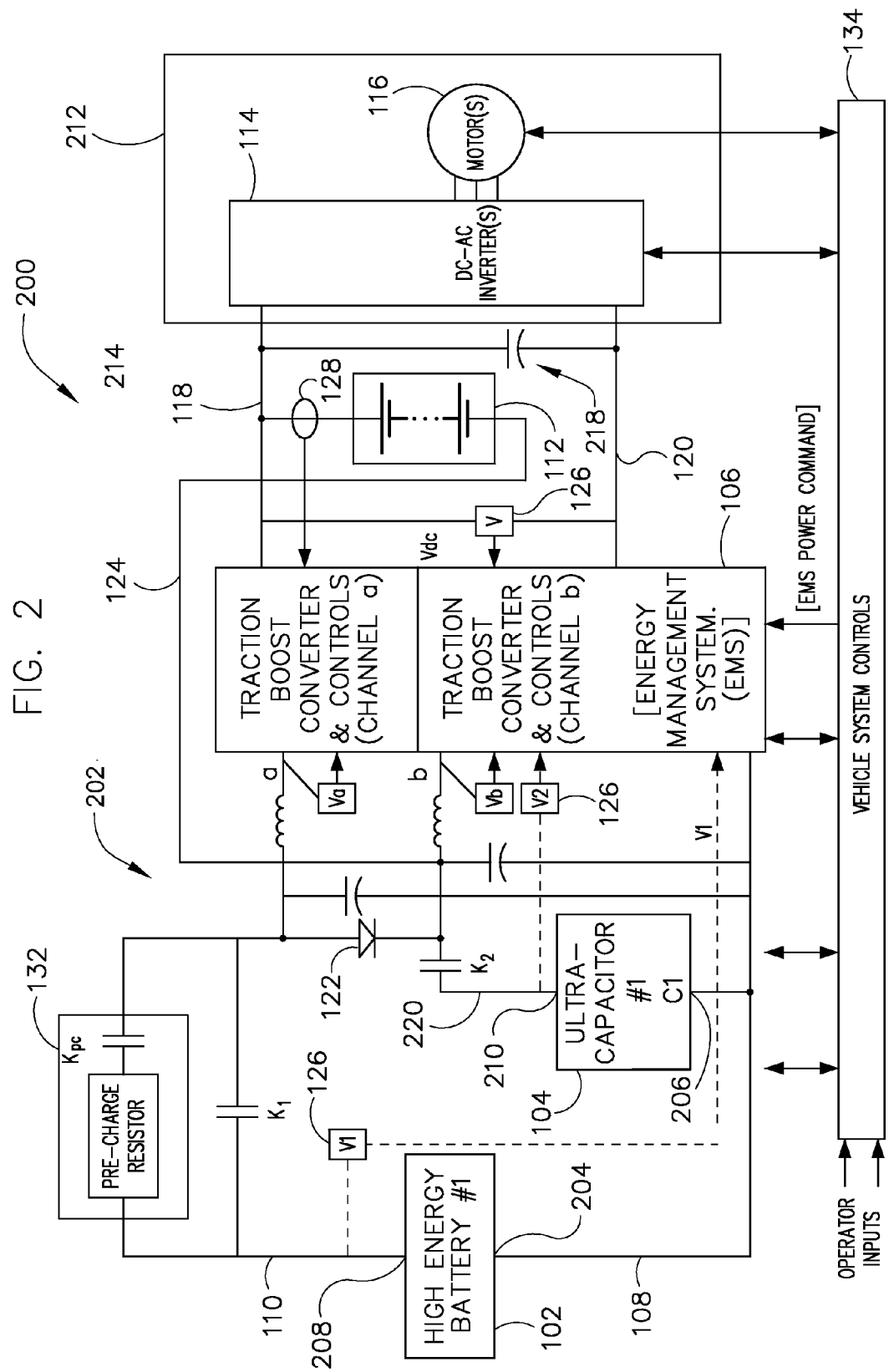
FIG. 2 schematically illustrates another embodiment of the propulsion system.

FIG. 2 illustrates another embodiment of the invention. Propulsion system 200 shown in FIG. 2 includes components similar to components shown in system 100 of FIG. 1, and thus numbers used to indicate components in FIG. 1 will also be used to indicate similar components in FIG. 2. As shown, system 200 includes the components of system 100, along with additional components such as a plurality of voltage sensors 126, a current sensor 128, a pre-charge circuit 132, and a Vehicle System Control (VSC) 134. Pre-charge circuit 132 acts to provide an initial pre-charge to a DC link filter capacitor 218 associated with DC-AC Inverter 114, plus other filter and energy storage capacitors associated with the EMS during vehicle start-up. Commands for such a vehicle start-up come from VCS 134, which receives operator inputs such as start-up, acceleration, and deceleration, and controls the operation of system 200 accordingly. It is to be understood that energy battery 102, high specific-power energy storage device 104, multi-channel bi-directional boost converter 106, and energy storage device 112 of system 200 may be operated similarly to that described above with respect to system 100. Alternatively, energy battery 102 may be removed from the first energy storage system, thereby making high specific-power energy storage device 104 the only energy storage device on low-voltage side 202 of system 200. Such a configuration would primarily be used in hybrid-electric drivetrain configurations, wherein a heat engine (not shown) could supplement the energy provided via the first energy storage system and the second energy storage system.

Figure 3:
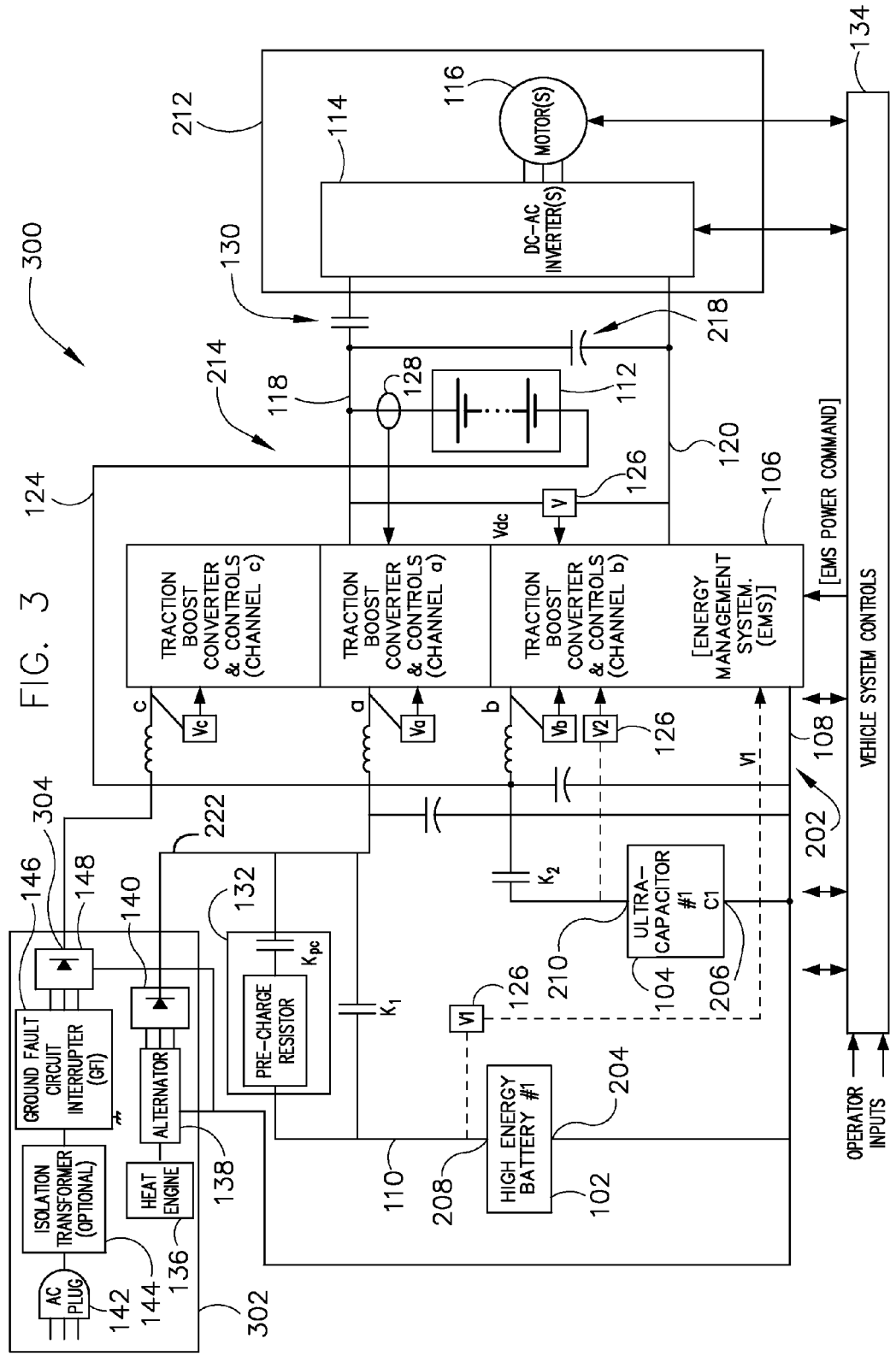
FIG. 3 schematically illustrates another embodiment of the propulsion system.

FIG. 3 illustrates yet another embodiment of the invention. Propulsion system 300 shown in FIG. 3 includes components similar to components shown in systems 100 and 200 of FIGS. 1 and 2, and thus numbers used to indicate components in FIGS. 1 and 2 will also be used to indicate similar components in FIG. 3. As shown, system 300 includes an auxiliary power unit 302 on low-voltage side 202 of multi-channel bi-directional boost converter 106. Auxiliary power unit 302 comprises a heat engine 136, an alternator 138, and a rectifier 140. Auxiliary power unit 302 of system 300 also includes a plug-in electrical system comprising an AC plug 142, an isolation transformer 144, a Ground Fault Current Interrupter (GFI) 146, and a rectifier 148. The output of rectifier 140 is coupled to bus 222 such that energy produced by heat engine 136 and alternator 138 may supplement the energy provided by high specific-power energy storage device 104, and/or energy battery 102. Furthermore, when heat engine 136 is operating, energy battery 102, high specific-power energy storage device 104, and energy storage device 112 selectively may be recharged using energy provided via heat engine 136, alternator 138, and rectifier 140. Control of the current, voltage, and power is controlled during recharge operation via VSC 134 and the EMS.

Alternatively, when energy battery 102, high specific-power energy storage device 104, and energy storage device 112 are not being used to operate motor 116, AC plug 142 may be coupled to an external electrical power source (i.e., the utility grid) to supply energy through rectifier 148 to the energy storage devices 102, 104, 112 in system 300. The output 304 of rectifier 148 is coupled through an inductor to a separate channel (e.g., channel "c") of multi-channel bi-directional boost converter 106 such that voltage, current, and power from the external electrical power source is controlled and is capable of being provided to any of energy battery 102, high specific-power energy storage device 104, and energy storage device 112 in system 300. In FIG. 3, a contactor 130 acts to prevent enablement of DC-AC inverter 114 during charging of energy battery 102, high specific-power energy storage device 104, and energy storage device 112 when the system is plugged into an electric utility interface via AC plug 142. While contactor 130 is shown between energy storage device 112 and DC-AC inverter 114, contactor 130 may be located elsewhere in system 300, including each phase on AC motor 116. Accordingly, when incorporated into a vehicle, system 300 shown in FIG. 3 is not only capable of energy recharge via heat engine 136 while under operation, but can also be recharged when the vehicle is not in use.

Unlike systems 100 and 200 respectively shown in FIGS. 1 and 2, system 300 illustrated in FIG. 3 is shown without a unidirectional coupling device (e.g., a diode) between energy battery 102 and high specific-power energy storage device 104. Without such a unidirectional coupling device, high specific-power energy storage device 104 may be discharged to a value substantially lower than the voltage of energy battery 102. In this way, the efficiency of system 300 during operation of AC motor 116 at low speed and low power is greatly improved.

Figure 4:
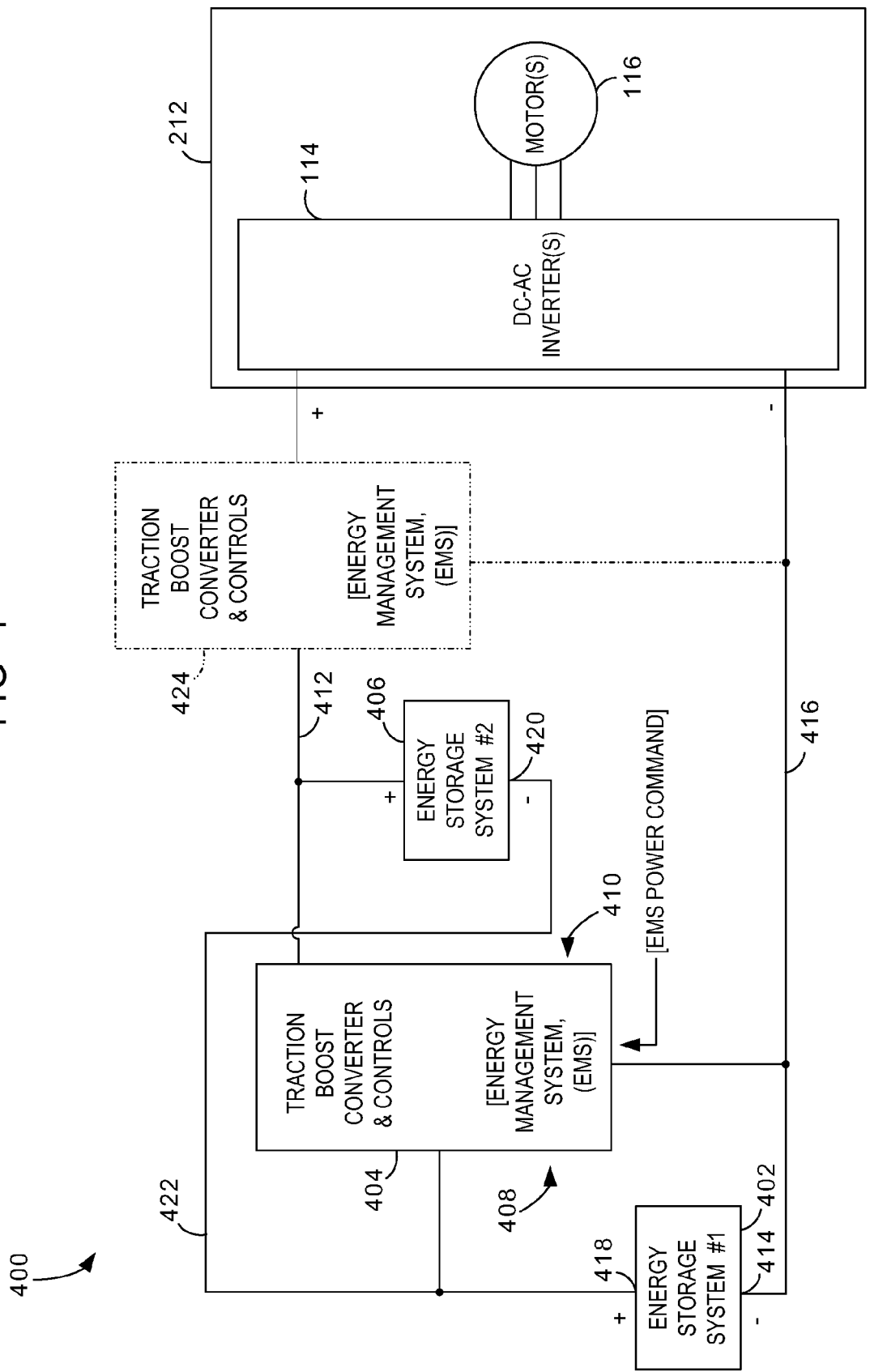
FIG. 4 schematically illustrates another embodiment of the propulsion system.

FIG. 4 illustrates yet another embodiment of the invention. Propulsion system 400 shown in FIG. 4 includes a number of components similar to components shown in systems 100, 200, and 300 of FIGS. 1-3, and thus numbers used to indicate components in FIGS. 1-3 will also be used to indicate similar components in FIG. 4. According to various embodiments, propulsion system 400 may be configured as an electric propulsion system, a hybrid propulsion system, or a plug-in hybrid-electric propulsion system, as examples.

As illustrated, propulsion system 400 includes, in part, a first energy storage system 402, a bi-directional boost converter 404, and a second energy storage system 406. Propulsion system 400 is configured such that first energy storage system 402 has a lower voltage than second energy storage system 406. In one embodiment, the voltage of second energy storage system 406 is a factor of three or greater higher than the voltage of first energy storage system 402.

First energy storage system 402, which is electrically coupled to a low-voltage side 408 of bi-directional boost converter 404, comprises a high specific-energy storage device having a relatively low specific power as compared with second energy storage system 406. As used herein, low specific power describes an energy storage device demonstrated to achieve a specific power on the order of 200 W/kg or lower. In one embodiment, first energy storage system 402 has a relatively high resistivity and impedance as compared with second energy storage system 406. In another embodiment, the relatively low specific power of energy storage system 402 may be due to an imbalance of the individual battery cells comprising the energy storage system. In one embodiment, first energy storage system 402 is a low-cost lithium ion battery. Alternatively, first energy storage system 402 may be a sodium metal halide battery, a sodium sulfur battery, a nickel metal halide battery, a lead acid battery, and the like.

Second energy storage system 406 comprises a high specific-power energy storage device and is electrically coupled to a high-voltage side 410 of bi-directional boost converter 404. Second energy storage system 406 may be, for example, an ultracapacitor having multiple capacitor cells coupled to one another, where the capacitor cells may each have a capacitance that is greater than 500 Farads, similar to high-specific power energy storage device 104 of FIG. 1. In an alternative embodiment, second energy storage system 406 is a high power battery having a specific-power of 350 W/kg or greater.

As shown in FIG. 4, first energy storage system 402 and second energy storage system 406 are coupled together in series to DC link 412. Specifically, a negative terminal 414 of first energy storage system 402 is connected to a negative side of DC link 416, and a positive terminal 418 of first energy storage system 402 is coupled in series with a negative terminal 420 of second energy storage system 406 via link 422. As shown, link 422 bypasses bi-directional boost converter 404 to enable the voltage outputs of energy storage systems 402, 406 to be summed on a positive side of DC link 412.

By connecting energy storage systems 402, 406 in series, the power sharing between energy storage systems 402, 406 is a function of the relative voltages of the two energy storage systems, rather than being based on the relative resistance of the energy storage systems, as is the case in propulsion systems where the energy storage units are configured in a hard parallel arrangement. In other words, the power out of each energy storage system 402, 406 is a function of the voltage of the respective energy storage system 402, 406 as a result of the series configuration. Because the series connection of energy storage systems 402, 406 allows the relative voltages of the two systems to be summed, energy storage systems 402, 406 may be sized to have lower voltages than a propulsion system with a parallel configuration with a comparable overall voltage output. Thus, each energy storage system 402, 406 may be constructed having fewer series-connected cells as compared with a conventional traction battery comprised of a large number of series connected battery cells coupled across the DC link or load. As such, the series connection of energy storage systems 402, 406 increases energy storage system reliability and reduces balancing issues and costs for each energy storage system 402, 406.

The series connection also passively reduces the power demand from first energy storage system 402 by placing it in series with the higher voltage second energy storage system 406. As a result of the series configuration and relative voltages of energy storage systems 402, 406, the majority of the link power comes from second energy storage system 406 under positive power demand (e.g., acceleration). Under negative power demand (e.g., regenerative braking), on the other hand, most of the link power charges second energy storage system 406. Thus, only a small fraction of the link power is available to charge first energy storage system 402. High power regenerative braking energy is captured in energy storage systems 402, 406 and can be used in subsequent accelerations. Because the second energy storage system 406 provides the majority of the power demand during acceleration, receives the majority of the link power during regenerative braking, and operates at a mid-range SOC, the overall power capability of propulsion system 400 is high for both discharge (acceleration) and charge (regenerative braking).

During operation of propulsion system 400, bi-directional boost converter 404 is operable as an Energy Management System (EMS) to adaptively control energy transfer through converter 404 for charging second energy storage system 406. The EMS operates to maintain the state of charge (SOC) and voltage range of second energy storage system 406 to maintain adequate power for both discharge (acceleration) and charge (regenerative braking) The EMS operates with adaptive control that may be programmed to vary with vehicle operating characteristics, such as, for example, vehicle speed, traction motor(s) speed, and motor torque. The adaptive control of EMS may also be programmed to vary based on the electrical characteristics of energy storage systems 402, 406, including SOC, voltage levels, state of health, and temperature, and the like. For example, when the SOC of second energy storage system 406 becomes too low, such dynamic control boosts voltage supplied by first energy storage system 402 and transmits the boosted voltage to second energy storage system 406 to maintain the SOC of second energy storage system 406. In one embodiment, the EMS of bi-directional boost converter 404 operates to maintain an SOC of second energy storage system 406 between a predetermined lower threshold value, such as, for example 40 percent, and a predetermined upper threshold value, such as, for example 70 percent.

During certain motoring events, motoring power/current selectively bypasses bi-directional boost converter 404 to utilize the benefits of the series connection of energy storage systems 402, 406. During heavy vehicle acceleration, for example, the combined voltage of energy storage devices 402, 406 may be used to provide sufficient voltage and power to AC motor 116 without incurring losses related to passing current through bi-directional boost converter 404. During regenerative braking events, regenerative energy can be efficiently stored in energy storage devices 402, 406 again without incurring the losses associated with the limitations of boost converter 404, as series link 422 enables current to bypass boost converter 404. The energy stored in energy storage devices 402, 406 can then be used for subsequent accelerations, which again improves the overall efficiency of the entire propulsion system 400.

The series connection of first energy storage system 402 and second energy storage system 406 has the benefit of reducing stress on the energy storage systems 402, 406, thereby improving battery life, as compared with a hard parallel configuration of energy storage systems 402, 406. For example, in a hard parallel configuration with energy storage system 402 configured as a low specific power battery and energy storage system 406 configured as an ultracapacitor, a high peak current flows from low specific power battery 402 to ultracapacitor 406 after an acceleration event to recharge ultracapacitor 406.

An additional benefit of the series configuration of propulsion system 400 is an improved efficiency as compared with a parallel configuration. The series arrangement of energy storage systems 402, 406 increases system efficiency by reducing the power demand on first energy storage system 402, which provides improved vehicle range due to a higher useable capacity of energy storage systems 402, 406. Further, because first energy storage system 402 only accounts for a small fraction of the total DC link voltage, the DC link voltage drop during acceleration and the DC link voltage rise during deceleration is much lower than in a parallel energy storage configuration due to the high resistance of first energy storage system 402.

Optionally, propulsion system 400 includes a second bi-directional converter 424 (shown in phantom) to control the DC link voltage. Adding second bi-directional converter 424 decouples the voltages of first energy storage system 402 and second energy storage system 406 from DC link 412, which provides a number of benefits, including greater flexibility in sizing first and second energy storage systems 402, 406.

The dual bi-directional boost converter arrangement also offsets the negative aspects of the higher resistance characterized by the use of a low specific power energy storage system. The use of the second bi-directional converter 424 provides DC link voltage control, which enables propulsion system 400 to be constructed with a smaller and less expensive motor and inverter and allows better control of motor power. Additionally, the dual boost converter arrangement also may result in lower current boost converters than a propulsion system including a multi-channel converter.

Therefore, according to one embodiment of the invention, a propulsion system includes an electric drive and a first energy storage system electrically coupled to the electric drive through a DC link, the first energy storage system comprising a high specific-energy storage device. The propulsion system also includes a second energy storage system electrically coupled to the first energy storage system in a series connection, the second energy storage system comprising a high specific-power storage device. The propulsion system further includes a first bi-directional boost converter electrically coupled to the first and second energy storage systems such that a terminal of the first energy storage system is electrically coupled to a low voltage side of the first bi-directional boost converter and a first terminal of the second energy storage system is coupled to a high voltage side of the first bi-directional boost converter. The series connection bypasses the first bi-directional boost converter.

According to another embodiment of the invention, a method of assembling a control system for an electric drive includes providing a first bi-directional boost converter and coupling a first terminal of a high specific-energy storage device to a low-voltage side of the first bi-directional boost converter. The method also includes coupling a first terminal of a high specific-power storage device to a high-voltage side of the first bi-directional boost converter, and coupling the high specific-energy storage device in series with the high specific-power storage device such that the first terminal of the high specific-energy storage device is electrically coupled to a second terminal of the high specific-power storage device.

According to yet another embodiment of the invention, an energy storage arrangement for an electrically powered system includes a first bi-directional boost converter and a first energy storage system electrically coupled to a first side of the first bi-directional boost converter, the first energy storage system comprising a high specific-energy storage device. The energy storage arrangement also includes a second energy storage system electrically coupled to a second side of the first bi-directional boost converter, the second energy storage system comprising a high specific-power storage device. Further, the energy storage arrangement includes an electrical link forming a series connection between a positive terminal of the first energy storage system and a negative terminal of the second energy storage system, wherein the electrical link bypasses the first bi-directional boost converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propulsion system comprising:
    an electric drive;
    a first energy storage system electrically coupled to the electric drive through a direct current (DC) link, the first energy storage system comprising a high specific-energy storage device;
    a second energy storage system electrically coupled to the first energy storage system in a series connection, the second energy storage system comprising a high specific-power storage device; and
    a first bi-directional boost converter electrically coupled to the first and second energy storage systems such that a terminal of the first energy storage system is electrically coupled to a low voltage side of the first bi-directional boost converter and a first terminal of the second energy storage system is coupled to a high voltage side of the first bi-directional boost converter; and
    wherein the series connection bypasses the first bi-directional boost converter.

2. The propulsion system of claim 1 wherein the first energy storage system comprises a low specific power battery.

3. The propulsion system of claim 2 wherein the first energy storage system comprises a lithium ion battery.

4. The propulsion system of claim 1 wherein the second energy storage system comprises a power battery.

5. The propulsion system of claim 1 wherein the second energy storage system comprises an ultracapacitor.

6. The propulsion system of claim 1 wherein the first bi-directional boost converter is configured to control an amount of energy transferred from the first energy storage system to the second energy storage system through the first bi-directional boost converter to maintain a state-of-charge (SOC) of the second energy storage system.

7. The propulsion system of claim 1 further comprising a second bi-directional boost converter, wherein a low voltage side of the second bi-directional boost converter is electrically coupled to the first terminal of the second energy storage system, and wherein a high voltage side of the second bi-directional boost converter is electrically coupled to the DC link.

8. The propulsion system of claim 7 wherein a power rating of the first bi-directional boost converter is lower than a power rating of the second bi-directional boost converter.

9. A method of assembling a control system for an electric drive comprising:
    providing a first bi-directional boost converter;
    coupling a first terminal of a high specific-energy storage device to a low-voltage side of the first bi-directional boost converter;
    coupling a first terminal of a high specific-power storage device to a high-voltage side of the first bi-directional boost converter; and
    coupling the high specific-energy storage device in series with the high specific-power storage device such that the first terminal of the high specific-energy storage device is electrically coupled to a second terminal of the high specific-power storage device.

10. The method of claim 9 wherein coupling the high specific-energy storage device to the high specific-power storage device further comprises providing an electrical link between the high specific-energy storage device and the high specific-power storage device that bypasses the first bi-directional boost converter.

11. The method of claim 9 further comprising:
    providing a second bi-directional boost converter having a power rating that is higher than a power rating of the first bi-directional boost converter; and
    coupling the first terminal of a high specific-power storage device to a low voltage side of the second bi-directional boost converter.

12. An energy storage arrangement for an electrically powered system, the arrangement comprising:
    a first bi-directional boost converter;
    a first energy storage system electrically coupled to a first side of the first bi-directional boost converter, the first energy storage system comprising a high specific-energy storage device;
    a second energy storage system electrically coupled to a second side of the first bi-directional boost converter, the second energy storage system comprising a high specific-power storage device;
    an electrical link forming a series connection between a positive terminal of the first energy storage system and a negative terminal of the second energy storage system, wherein the electrical link bypasses the first bi-directional boost converter.

13. The energy storage arrangement of claim 12 wherein the first energy storage system comprises a low specific power battery.

14. The energy storage arrangement of claim 12 wherein the second energy storage system comprises a power battery.

15. The energy storage arrangement of claim 12 wherein the second energy storage system comprises an ultracapacitor.

16. The energy storage arrangement of claim 12 wherein the first bi-directional boost converter comprises an energy management system programmed to selectively transmit a charging voltage from the first energy storage system to the second energy storage system.

17. The energy storage arrangement of claim 16 wherein the energy management system is programmed to maintain a state-of-charge (SOC) of the second energy storage system between a predetermined lower threshold and a predetermined upper threshold.

18. The energy storage arrangement of claim 12 wherein a voltage of the first energy storage system is lower than a voltage of the second energy storage system.

19. The energy storage arrangement of claim 12 further comprising a second bi-directional boost converter having a low voltage side electrically coupled to a positive terminal of the second energy storage system.

20. The energy storage arrangement of claim 19 wherein a power rating of the second bi-directional boost converter is higher than a power rating of the first bi-directional boost converter.

* * * * *